Oct. 13, 1964   S. A. LUNDEEN   3,152,607
METERING VALVE FOR A WATER SOFTENING SYSTEM
Filed Oct. 6, 1960
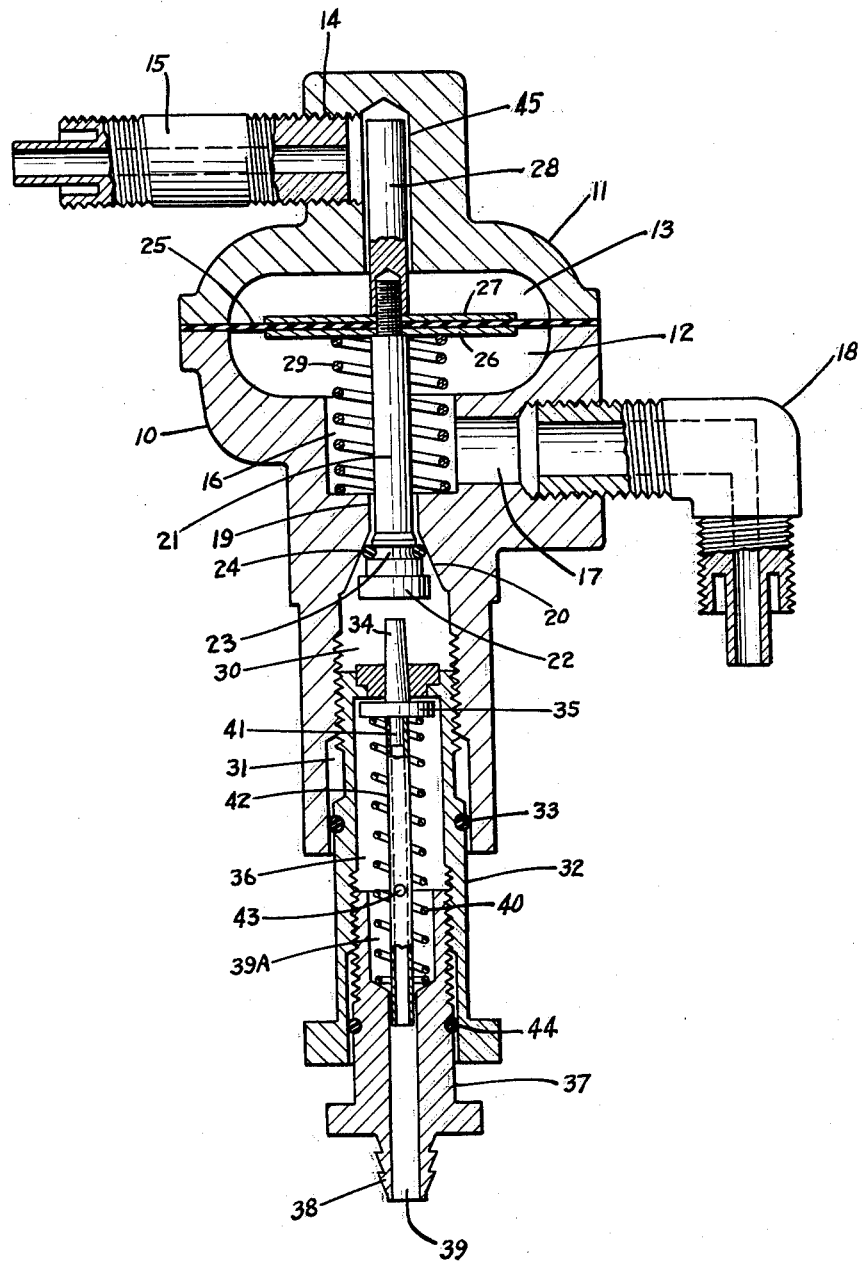
*INVENTOR.*
STANLEY A. LUNDEEN
BY
Moore, White & Burd
*ATTORNEYS*

United States Patent Office 3,152,607
Patented Oct. 13, 1964

3,152,607
METERING VALVE FOR A WATER
SOFTENING SYSTEM
Stanley A. Lundeen, 2946 Stinson Blvd.,
Minneapolis 18, Minn.
Filed Oct. 6, 1960, Ser. No. 60,828
6 Claims. (Cl. 137—505.13)

This invention relates to an improved valve means for metering out a predetermined proportion of fluid passing through a flow line under pressure. More particularly, this invention relates to improved valve means for metering out water from a pressurized water flow line in a predetermined proportion of the water passing through the flow line.

The improved metering valve of this invention is an improvement over the metering valve disclosed in my copending application Serial No. 676,777 filed August 7, 1957 (now Patent No. 3,048,274, issued August 7, 1962) and this application is a continuation-in-part of that application. Like its prototype, the present valve finds a special utility in water-softening systems and for convenience will be described in detail as used for that purpose. It will be understood, however, that the utility of the improved metering valve is not so limited.

Water-softening systems presently in widespread use operate upon an ion exchange principle. It is well known that the so-called "hardness" in water is due principally to dissolve calcium and magnesium salts. It is well known to soften hard water by passing it through a bed of ion exchange material so that in the course of its passage through the ion exchange material, the calcium and/or magnesium ions are replaced by sodium ions from the exchange material.

The capacity of ion exchange materials to replace calcium and magnesium ions with sodium ions is, of course, not unlimited. After exhaustion, the ion exchange materials may, however, be regenerated by passing a solution containing sodium ions, usually a brine solution, through the bed of ion exchange material and the reverse reaction takes place wherein sodium replaces calcium and magnesium in the ion exchange material and the calcium and magnesium ions are flushed from the system as chlorides.

For any given water softener installation, the capacity of the bed of ion exchange material is known and the average hardness of the water used at that installation is also known. The average amount of water used at any given installation can readily be calculated. From these known facts the frequency with which the bed of ion exchange material must be regenerated to insure a constant supply of soft water can readily be calculated. Depending upon the capacity and volume of ion exchange material, the hardness of the water, and water consumption, the frequency with which the ion exchange material must be regenerated may vary widely from every day or two up to once every two weeks or so.

Because, in most installations, hard water is drawn at the soft water taps during the period of regeneration, it is customary that the regeneration cycle is carried out during periods of low water consumption, usually in the middle of the night. For this reason and because water consumption may fluctuate widely, it is the usual practice to provide a wide margin of safety so that the ion exchange material is regenerated before its exchange capacity has become exhausted in order that the user will be assured of a constant supply of soft water.

Thus, for example, in a typical installation of a completely automatic home water softening system, it may be determined on the basis of the volume and capacity of the water softener, the hardness of the water, and the average water consumption of the household that regeneration is necessary every fourth day. In order to provide for normal fluctuations in water consumption in such an instance, while still insuring a constant supply of soft water, the timing mechanism of the water softening system would be set so as to initiate the regeneration cycle every third day at an hour of low water consumption, such as 3:00 a.m. The one day margin of safety would safeguard against exhaustion of the bed of water softening material due to use of larger than normal amounts of soft water as would be occasioned by such circumstances as laundry days, a temporary increase in the size of the household caused by visitors, increased water consumption due to weather, etc. Thereafter, the bed of water softening mineral will be regenerated every third day at 3:00 a.m. regardless of the amount of water actually used. Thus, for example, if the householder is away for two-weeks vacation, his water softening system will regenerate itself every third day in spite of the fact that no water has been used. Since no hard water has passed through the system and regeneration is not therefore necessary, the brine and power required to carry out the useless regeneration cycle is wasted.

It is the principal object of this invention to provide an improved metering valve by which the water used to prepare a saturated brine solution for passage through the bed of ion exchange water softening material of a water softening system during the regeneration cycle, is metered into a brine generating vessel in fixed predetermined proportion to the amount of water consumed, whereby regeneration of the softening mineral is dependent upon the amount of water consumed.

It is another object of this invention to provide an improved metering means whereby a predetermined proportion of fluid in a pressurized flow line is metered out from that flow line.

It is a further object of this invention to provide improved pressure-sensitive valving means adapted to meter out a predetermined proportion of fluid from a pressurized flow line upon a drop in pressure in that flow line.

It is a still further object of this invention to provide a combination valve means including a metering needle valve and a pressure-sensitive diaphragm actuated control valve therefor.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the single figure of the drawing which is a vertical sectional view illustrating the details of construction of the improved metering valve of this invention.

Referring to the drawing, the improved metering valve of this invention includes a casing 10 and a cap 11 adapted to be secured thereto by means of screws or bolts or like conventional fastening means (not shown). The top surface of casing 10 is provided with a shallow bowl-shaped depression 12, which serves as a pressure chamber in the assembled valve. The bottom surface of the cap 11 is likewise provided with a shallow, bowl-shaped depression 13, which acts as a pressure chamber in the completed valve. The opposed annular faces of the casing 10 and cap 11 are smooth and flat in order to provide a tight fit when the valve is assembled. The upper portion of cap 11 includes a projecting boss, one side of which is provided with a tap 14 as an inlet to the pressure chamber 13. The tap 14 is provided with a fitting 15 by which the inlet may be connected to a source of relatively constant high fluid pressure.

The valve casing 10 is provided with a central annular channel 16, which serves as an extension of pressure chamber 12. The chamber extension 16 communicates with a tapped inlet 17, which is provided with a fitting 18 by which the pressure chamber 12 may be connected to a pressurized fluid flow line. The pressure chamber extension 16 is also provided with a central outlet channel or port 19 exiting from the pressure chamber. The outlet or port 19 is provided with an outer flaring valve seat 20 adapted to receive an O-ring valving member. The O-ring valving member includes a bolt-like stem 21 having an enlarged head 22 which is larger than the diameter of the outlet port 19. Below the enlarged head, the valve stem 21 is provided with an annular groove 23, fitted with a resilient O-ring 24 whose outer periphery seats against the valve seat 20.

A resilient diaphragm 25 is fitted between the opposed faces of the casing 10 and cap 11 so that when the cap is fastened into place on the casing, a fluid-tight seal is formed. The O-ring valving member is responsive to changes in pressure in the pressure chambers 12 and 13. To accomplish this, the threaded end of the O-ring valve stem 21 extends through a central opening in the diaphragm 25 and through reinforcing washers 26 and 27 on opposite sides of the diaphragm and is secured by an internally threaded pilot stem 28. The O-ring valving member is normally urged into closed position by means of a coil spring 29 surrounding the valve stem 21 seated in the bottom of the channel 16 and pushing against the washer 26. The O-ring stem 21 and pilot stem 28 are disposed with their axes perpendicular to the plane of diaphragm 25 in its normal at-rest position.

The casing 10 is provided with a lower tapped channel 30 communicating with the outlet port 19 and an extension channel 31 of somewhat larger diameter. A threaded thimble or shouldered sleeve 32 is fitted into the channels 30 and 31. The outer periphery of thimble 32 is provided with an annular channel fitted with a resilient O-ring 33. The O-ring is intermediate of the ends of the thimble 32 so that when the thimble is threaded into the tapped channel 30, the O-ring slides with a tight sealing fit on the smooth walls of channel 31.

The thimble 32 has one closed end which is provided with a port or channel into which the needle 34 of a needle-valving member is fitted. The port or channel is preferably formed in a pressed-in insert of stainless steel or similar wear resistant material. The needle 34 is tapered and is integral with a base 35 of larger diameter which is disposed in the chamber 36 in the interior of the thimble 32. The open end of thimble 32 is tapped and is fitted with a tubular plug 37 terminating in a nipple 38 having a port in communication with channel 39 extending through plug member 38 and which serves as the outlet from the chamber 36. The needle valving member 34 is normally urged into closed position by means of a coil spring 40 which seats on a shoulder on the base 35 of the needle valving member and in an enlargement 39A of channel 39 at the top of the fitting 37.

The lower face of base 35 of the needle valve member is provided with a projecting stem or stud 41 on to which is press fit a hollow tube 42 which extends and fits with a loose slide fit in the channel 39 of the tubular plug 37. The tube 42 fits with a loose slide fit in the channel 39 in order to permit the passage of water through the annulus between the inside wall of the channel and the outside wall of the tube. To insure against any stoppage of this water flow the end of tube 42 in channel 39 is open. A plurality of holes 43 in the wall of tube 42 communicates with the inside of the tube so as to permit water admitted by needle valve member 34 into the chamber 36 to pass through the holes 43 into tube 42 and out through the open end of the tube into channel 39. Tube 42 is encircled by the coil spring 40.

The tube 42 functions as a pilot stem to insure the alignment of the needle 34 of the needle valving member in the port or channel in which it is fit. This minimizes wear and obviates the possibility of the needle becoming canted at an angle and wedged in the needle valve port.

The outer periphery of the plug member 37 is provided with an annular groove fitted with a resilient O-ring 44 below the threads. The O-ring 44 functions to provide a tight seal against escape of water from chamber 36. When the plug member 38 is threaded into the thimble 32 to adjust the tension in the coil spring 40 the O-ring slides with a tight sealing fit on the smooth walls of the thimble channel below the internal threads of that channel.

The pilot stem 28 fits with a loose slide fit in the channel 45 drilled in the boss at the top of the valve housing cap 11 in communication with the tap 14. The annulus between the pilot stem 28 and the inside wall of the channel 45 is sufficient to permit the passage of water from fitting 15 in order to exert the greater pressure of the hard water main on the pressure chamber 13 to flex the diaphragm 25 when the pressure in chamber 12 is reduced by the drawing of soft water. The pilot stem 28 functions to maintain the valve stem 21, its enlarged head 22 and O-ring 24 in alignment with channel 19 and valve seat 20, as well as in alignment with needle 34 of the needle valve element. This insures against canting of the valve stem 21 and obviates the possibility of the valve stem becoming wedged in the channel 19 forcing the O-ring 24 out of engagement with the valve seat 20 and permitting leakage of water through the valve when it should be normally closed.

The O-ring valving member 24 is responsive to changes of pressure in the pressure chambers 12 and 13. So long as the pressure in chamber 13 is less than the combined pressure of the fluid in chamber 12 plus the spring pressure of spring 29, the O-ring valve remains closed. So long as the O-ring valve remains closed, the needle valve likewise remains closed by virtue of the pressure of spring 40. When the fluid pressure in chamber 13 exceeds the combined spring and fluid pressure in chamber 12, the flexible diaphragm is moved so as to enlarge the volume of the pressure chamber 13 and in so moving, depresses the O-ring valve to unseat the O-ring 24 from the valve seat 20.

Immediately upon the opening of the O-ring valve, the fluid in the pressure chamber 12, the channel 16 and the port 19 is released and flows outwardly through the O-ring valve under pressure of incoming fluid supplied to fitting 18 and channel 17 from the pressurized soft water flowline to which the fitting is connected. This surge of fluid pressure into chamber 30 unseats the needle 34 of the needle valve permitting flow of fluid through the needle valve into the chamber 36 and out through the outlet channel 39. The fluid flows around tube 42 and through holes 43 and out the open end of the tube to the outlet. This is an instantaneous reaction, which occurs immediately upon opening of the O-ring valve before the head 22 of the O-ring valve stem contacts the needle 34 of the needle valve means and depresses the needle against the pressure of coil spring 40.

The needle valving element 34 is tapered to regulate the rate of flow to the port from chamber 30. The greater distance the needle valving element is depressed by the O-ring valve stem, the greater will be the rate of flow through the metering valve. The rate of flow is adjustable because of the adjustability of the thimble 32 in the sleeve forming channel 30. The farther the thimble 32 is screwed into the channel 30, the farther the O-ring valve stem will depress the needle valve and the greater will be the rate of flow. The pressure of spring 40 on the needle valve is adjustable by movement of the threaded plug member 37.

The needle valving element is preferably so constructed that the broadened base member 35 will bottom against the top end wall of the thimble 32 at the same time that the needle element 34 seats in the outlet port in the thimble end wall. In this way, the initial surge of fluid pressure in channel 30 is sufficient to unseat the needle valve and initiate flow of fluid from channel 30 even before the O-ring stem contacts the needle valving element. The fluid passed by the needle valve flows into channel 36 and out through the outlet channel 39.

According to a typical installation of the metering valve according to this invention in a water softening system, the pressure chamber 13 is connected through fitting 15 to the water main on the hard-water side of the softening system. In this manner, the fluid pressure chamber 13 and the resilient diaphragm 25 are constantly subjected to the relatively high and constant pressure of the hard water supply main. The fluid pressure chamber 12 and channel 16 are connected through fitting 18 to the soft water delivery line side of the softening system. Normally, when no water is being drawn, the pressure in the soft water line will be substantially equal to that in the hard water line so that the pressure in chamber 12 will be equalized with that in chamber 13. To insure against any possible leakage when the diaphragm 25 is thus in a state of equilibrium, the pressure of coil spring 29 maintains the O-ring valve closed.

As soon as any soft water tap is opened there is an immediate drop in pressure in the soft water delivery lines. Accordingly, there is an instant drop in pressure in the pressure chamber 12. Since the relatively high pressure of the hard water main is undiminished, the fluid pressure in chamber 13 remains substantially the same and is then greater than the pressure in chamber 12. The greater pressure against the flexible diaphragm 25 from pressure chamber 13 displaces the diaphragm in the direction of the reduced pressure zone in chamber 12 and in so doing, moves the valve stem 21 so as to unseat the O-ring 24 from the valve seat 20. Water from fitting 15 may surge around the pilot stem. The pilot stem moves in its channel while maintaining the alignment of the O-ring stem.

The instant the O-ring valve is opened, there is a surge of increased pressure in chamber 30 which unseats the needle valve and initiates a flow of fluid from the soft water line to a brine generating vessel which receives the flow from the outlet channel 39. The O-ring plunger contacts the needle valving element so as to open the needle valve a predetermined distance as determined by the depth to which the thimble 32 is screwed into the channel 30 of the valve casing 10. Thus, so long as water is flowing through the soft water delivery line, a predetermined small amount of that soft water flow is being diverted and metered into the brine generating tank.

The amount of soft water which is metered into the brine tank is determined by the hardness of the water supply and the capacity of the water softening mineral in the system. The volume of saturated brine required to regenerate the ion exchange material in the water softener is readily calculated. The soft water is metered into the brine tank in such predetermined small proportion that a saturated brine solution of the required volume will be available for regeneration when the water softening capacity of the mineral bed is nearly depleted because of the volume of hard water which has passed through it. The saturated brine solution is formed only as needed. During periods of relatively high water consumption the brine will be prepared relatively faster in direct proportions to the amount of water used. Conversely, during periods of low water consumption, the brine will still be generated in proportion to the amount of water used but it will take a longer period in which to prepare a volume of brine adequate for regeneration of the water softening bed. During periods in which no water is used, no brine will be formed and no regeneration of the water softener will occur.

In an automatic water softening system, including the metering valve of this invention, the timing mechanism will be set to initiate the regeneration cycle at some convenient hour, such as, for example, 3:00 a.m. The timing mechanism, as described and claimed in my copending application, Serial No. 693,481, filed October 30, 1957 (now Patent No. 3,055,994, issued September 25, 1962), includes a simple float means by which it is rendered inoperative to initiate the regeneration cycle except when a predetermined volume of brine is present in the brine tank as determined by the level of the float means.

During periods of high water consumption, the level of the brine solution will rise relatively rapidly and each day that the brine level is at the predetermined height to regenerate the bed of water softening mineral at the convenient time selected to initiate the regeneraion, the float means will permit the timing mechanism to actuate the controls to initiate the regeneration cycle. On the other hand, each day when at the selected time the brine level is below the level indicated for regeneration, the regeneration cycle will be skipped for that 24-hour period.

As with existing automatic water softening systems, a margin of safety is provided so that the regeneration cycle begins before the water softening capacity of the bed is completely exhausted. Thus, if the level of the brine tank rises to the level which will permit initiation of the regeneration cycle between the time periods during which regeneration may be started, the margin of safety provided insures that soft water will be delivered until the next regeneration cycle is initiated. It will be seen that by means of the use of the metering valve of this invention, regenerating brine is prepared and the regeneration cycle is controlled by the volume of soft water used.

Although it is desirable that the stabilizing pilot means for the needle valve be a hollow tube as illustrated and described, it will be apparent that other forms of pilot means may be used. For example, instead of being tubular in form, the pilot may be a fluted rod, the flutes providing channels for passage of water. The pilot may be simply a cylindrical rod of diameter such that ample clearance is provided with outlet channel 39 to permit escape flow of water.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A valve means for metering a predetermined amount of fluid from a pressurized flow line comprising a valve body, a first cavity in said valve body, a resilient diaphragm dividing said cavity into two pressure chambers, means adapted to connect one of said pressure chambers to said flow line at a point of relatively constant high pressure, means adapted to connect the other of said pressure chambers to said flow line at a point of variable pressure, a second cavity in said valve body, an outlet port from said other pressure chamber communicating with said second cavity, a control valving element connected to said diaphragm and responsive to variations in pressure thereon controlling said port, said control valving element being a resilient O-ring carried on a perpendicular stem connected to said diaphragm and disposed and adapted to seat in a flared segment of the outlet port communicating between said other pressure chamber and second cavity, an outlet port from said second cavity, an adjustable variable flow valving element controlling said last-named port, said variable flow valving element being a tapered needle valve disposed below said O-ring stem and operable in response to movement of said stem, stabilizing means for said needle valve to maintain said needle valve axially aligned with the O-ring stem, said stabilizing means being an elongated hollow tube extending axially from said needle valve and slidably movable in a means forming a channel axially aligned with said needle valve and forming an outlet channel for fluid flow through said needle valve, said tube being open on the end remote from said needle valve and having a plurality of openings in said tube wall to facilitate fluid flow, coil spring means around said tube exerting resilient pressure against said needle valve, means including said channel-forming means for adjusting the resilient pressure on the needle valve, and means for varying the spacing between said valving elements to regulate the rate of flow through said valve means.

2. Valve means according to claim 1 further characterized in that further stabilizing means are provided for said O-ring stem, said means including a pilot stem axially aligned with said O-ring stem and rigidly secured thereto on the opposite side of said resilient diaphragm, the free end of said pilot stem being slidably movable in a channel in said valve body axially aligned with said O-ring stem.

3. In a water softening system including valve means for metering a predetermined amount of soft water from the soft water delivery line into a brine generating tank, the amount of soft water metered into the brine tank being dependent upon the volume of soft water consumed, said valve means comprising a valve body, a cavity in said body, a resilient diaphragm dividing said cavity into two pressure chambers, means connecting one of said pressure chambers to the hard water supply line of said system and means connecting the other of said pressure chambers to the soft water delivery line, an outlet port from said other chamber, a valving element responsive to variations in pressure upon said diaphragm controlling said port, said pressure responsive valving element being an O-ring carried on a stem connected perpendicular to said diaphragm and disposed and adapted to seat in an outer flared segment of said outlet port, a chamber in communication with said port, a variable flow valving element in communication with said last-named chamber, said variable flow valving element being a tapered needle valve disposed below said O-ring stem and operable in response to movement of said stem, stabilizing means for said needle valve to maintain said needle valve axially aligned with the O-ring stem, said stabilizing means being an elongated hollow tube extending axially from said needle valve and slidably movable in a means forming a channel axially aligned with said needle valve and forming an outlet channel for fluid flow through said needle valve, said tube being open on the end remote from said needle valve and having a plurality of openings in said tube wall to facilitate fluid flow, coil spring means around said tube exerting resilient pressure against said needle valve, means including said channel-forming means for adjusting the resilient pressure on the needle valve, adjusting means for regulating the rate of flow from said chamber and means directing said regulated flow to a brine tank.

4. In a water softening system, valve means according to claim 3 further characterized in that further stabilizing means are provided for said O-ring stem, said means including a pilot stem axially aligned with said O-ring stem and rigidly secured thereto on the opposite side of said resilient diaphragm, the free end of said pilot stem being slidably movable in a channel in said valve body axially aligned with said O-ring stem.

5. Valve means for metering a predetermined proportional amount of fluid from a pressurized fluid flow line in response to variation of pressure in that line, said valve means comprising a valve body, a first cavity in said valve body, a resilient diaphragm dividing said cavity into two pressure chambers, fitting means in communication with the first of said pressure chambers and adapted to connect said first pressure chamber to a flow line at a point of relatively constant high fluid pressure, fitting means in communication with the second of said pressure chambers and adapted to connect said second chamber to the same flow line at a point of variable fluid pressure, a second cavity in said valve body, a first outlet port from said second pressure chamber communicating with said second cavity, a control valving element positioned in said first port to control flow of fluid therethrough, said control valving element being connected to said diaphragm and responsive to variations in fluid pressure thereon, said control valving element being a resilient O-ring carried on a stem whose axis is perpendicular to the normal at-rest plane of said diaphragm and is disposed and adapted to seat in a flared segment of the outlet port communicating between said second pressure chamber and said second cavity, a second outlet port from said second cavity, an adjustable variable flow valving element positioned in said second port to control flow of fluid therethrough, said variable flow valving element being a tapered needle valve disposed below said O-ring stem spaced therefrom and operable in response to movement of said stem, said ports and valving elements being axially aligned, the axis of alignment being substantially perpendicular to the normal at-rest plane of said diaphragm, means for varying the spacing between said valving elements to regulate the rate of flow through said valve means, stabilizing means for said needle valve including an elongated tube extending axially from said needle valve and slideably movable in a means forming a channel axially aligned with said needle valve and forming an outlet channel from said valve body for fluid flow through said needle valve, said tube being open on the end remote from said needle valve, and a plurality of openings in said tube wall to facilitate fluid flow, coil spring means around said tube exerting resilient pressure against said needle valve, and means including said channel-forming means for adjusting the resilient pressure on the needle valve.

6. Valve means according to claim 5 further characterized in that further stabilizing means are provided for said O-ring stem, said means including a pilot stem axially aligned with said O-ring stem and rigidly secured thereto on the opposite side of said resilient diaphragm, the free end of said pilot stem being slideably movable in a channel in said valve body axially aligned with said O-ring stem, ports and valving elements and needle valve stabilizing means.

References Cited in the file of this patent

UNITED STATES PATENTS

| | | |
|---|---|---|
| 448,065 | McShane | Mar. 10, 1891 |
| 1,239,022 | McClean | Sept. 4, 1917 |
| 1,712,798 | Johnston | May 14, 1929 |
| 2,602,467 | Griswold | July 8, 1952 |
| 3,048,274 | Lundeen | Aug. 7, 1962 |